United States Patent
Anderson

(10) Patent No.: US 9,066,337 B2
(45) Date of Patent: Jun. 23, 2015

(54) APPARATUS AND METHOD FOR COMMUNICATING SIGNALING INFORMATION

(71) Applicant: Nvidia Corporation, Santa Clara, CA (US)

(72) Inventor: Nicholas William Anderson, Bristol (GB)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/456,284

(22) Filed: Aug. 11, 2014

(65) Prior Publication Data

US 2014/0355496 A1 Dec. 4, 2014

Related U.S. Application Data

(60) Division of application No. 12/906,607, filed on Oct. 18, 2010, now Pat. No. 8,804,580, which is a continuation of application No. 11/241,630, filed on Sep. 30, 2005, now Pat. No. 7,817,613.

(30) Foreign Application Priority Data

Aug. 24, 2005 (GB) .................................. 0517219.2

(51) Int. Cl.
*H04W 72/04* (2009.01)
*H04W 72/14* (2009.01)
(Continued)

(52) U.S. Cl.
CPC ........ *H04W 72/0413* (2013.01); *H04W 72/042* (2013.01); *H04W 72/1263* (2013.01); *H04W 72/14* (2013.01); *H04W 84/042* (2013.01); *H04W 72/1268* (2013.01)

(58) Field of Classification Search
CPC .............. H04W 72/04; H04W 74/002; H04W 74/0833; H04W 74/0866; H04J 3/00
USPC .................. 370/280, 342, 329, 335, 252, 328
See application file for complete search history.

(56) References Cited

U.S. PATENT DOCUMENTS 6,678,314 B2  1/2004  Juntti et al.
6,801,517 B2 * 10/2004  Dick et al. .................... 370/342
(Continued)

FOREIGN PATENT DOCUMENTS

EP    0681406    11/1995
EP    1168876    1/2002
(Continued)

OTHER PUBLICATIONS

3rd Generation Partnership Project; Technical Specification Group Radio Access Network; 3.84 Mcps TDD EnhancedUplink; RAN WG2 Stage 2 Decisions, (Release 7), (Sep. 2005). 3GPP:Valbonne, France, TR 30.301 v0.2.0:1-25.

(Continued)

*Primary Examiner* — Jamal Javaid

(57) ABSTRACT

A wireless subscriber communication unit is provided for operation in a cellular communication system having a plurality of shared uplink and downlink transmission resources, each divided into sets of mutually exclusive resources. The shared uplink transmission resources are defined in terms of codes and timeslots. The communication unit comprises a receiver, control, and transmitter unit. The receiver unit receives scheduling information including an assignment of a scheduled uplink transmission resource from the shared uplink transmission resources from a network infrastructure apparatus. The control unit derives an uplink resource identifier related to the scheduled uplink transmission resource from the received scheduling information. The transmitter unit transmits an uplink transmission, which includes the uplink resource identifier, using the scheduled uplink transmission resource. The control unit receives a downlink transmission associated with the uplink transmission on a downlink transmission resource determined from at least one of the received scheduled uplink resource or identifier.

10 Claims, 10 Drawing Sheets

(51) Int. Cl.
H04W 72/12 (2009.01)
H04W 84/04 (2009.01)

(56) References Cited

U.S. PATENT DOCUMENTS

| | | | |
|---|---|---|---|
| 6,983,162 | B2 | 1/2006 | Garani et al. |
| 7,817,613 | B2 | 10/2010 | Anderson |
| 7,870,259 | B2 * | 1/2011 | Meyer et al. ............ 709/227 |
| 8,134,994 | B2 | 3/2012 | Liu et al. |
| 2004/0037240 | A1 * | 2/2004 | Gautney et al. ........... 370/329 |
| 2005/0068920 | A1 | 3/2005 | Zhang |
| 2005/0232154 | A1 * | 10/2005 | Bang et al. ............ 370/235 |
| 2008/0305790 | A1 | 12/2008 | Wakabayashi |

FOREIGN PATENT DOCUMENTS

| | | |
|---|---|---|
| EP | 1418786 | 5/2004 |
| WO | 00/70903 | 11/2000 |
| WO | 2004019528 | 3/2004 |

OTHER PUBLICATIONS

Universal Mobile Telecommunications System (UMTS); FDD Enhanced Uplink; Overall Description; Stage 2 (3GPP TS 25.309 version 6.3.0 Release 6), (Jun. 2005). ETSI TS 125 309 v6.3:1-33.
Great Britain Search Report dated Sep. 19, 2006, Great Britain Application No. 0517219.2 filed Aug. 24, 2005, 1 page.
Halma, H. et al. eds. (2001). WCDMA for UMTS: Radio Access for Third Generation Mobile Communications. JohnWiley & Sons Ltd., West Sussex, England, 10 pages. (Table of Contents).
International Search Report dated Oct. 12, 2006, PCT Application No. PCT/EP2006/064034 filed Jul. 7, 2006, 3 pages.
Samsung, (Aug. 16-20, 2004). "Node B Controlled Scheduling," 3GPP TSG RAN WG1 Meeting #38, R1-040851, Prague, Czech Republic, 10 pages.
3rd Generation Partnership Project, Technical Specification Group Services and System Aspects, Technical Specifications and Technical Reports for a UTRAN-based 3GPP system, (Release 6) 3GPP TS 21.101 V6.2.0 (Jun. 2005).
3rd Generation Partnership Project, Technical Specification Group Services and System Aspects, Evolution of 3GPP System, (Release 6) 3GPP TR 21.902 V6.0.0 (Sep. 2003).
3rd Generation Partnership Project, Technical Specification Group Services and Systems Aspects, Network Architecture (Release 6) 3GPP TS 23.002 V6.8.0 (Jun. 2005).
3rd Generation Partnership Project, Technical Specification Group Radio Access Network, User Equipment (UE) radio transmission and reception (FDD) (Release 6) 3GPP TS 25.101 V6.8.0 (Jun. 2005).
3rd Generation Partnership Project, Technical Specification Group Radio Access Network, User Equipment (UE) radio transmission and reception (TDD) (Release 6) 3GPP TS 25.102 V6.1.0 (Jun. 2005).
3rd Generation Partnership Project, Technical Specification Group Radio Access Network, Base Station (BS) radio transmission and reception (FDD) (Release 6) 3GPP TS 25.104 V6.9.0 (Jun. 2005).
3rd Generation Partnership Project, Technical Specification Group Radio Access Network, Base Station (BS) radio transmission and reception (TDD) (Release 6) 3GPP TS 25.105 V6.2.0 (Dec. 2004).
3rd Generation Partnership Project, Technical Specification Group Radio Access Network, Physical channels and mapping of transport channels onto physical channels (FDD) (Release 6), 3GPP TS 25.211 V6.5.0 (Jun. 2005).
3rd Generation Partnership Project, Technical Specification Group Radio Access Network, Multiplexing and channel coding (FDD) (Release 6), 3GPP TS 25.212 V6.5.0 (Jun. 2005).
3rd Generation Partnership Project, Technical Specification Group Radio Access Network, Spreading and modulation (FDD) (Release 6) 3GPP TS 25.213 V6.3.0 (Jun. 2005).
3rd Generation Partnership Project. Technical Specification Group Radio Access Network, Physical layer procedures (FDD) (Release 6) 3GPP TS 25.214 V6.6.0 (Jun. 2005).
3rd Generation Partnership Project, Technical Specification Group Radio Access Network, Physical layer-Measurements (FDD) (Release 6) 3GPP TS 25.215 V6.3.0 (Jun. 2005).
3rd Generation Partnership Project, Technical Specification Group Radio Access Network, Physical channels and mapping of transport channels onto physical channels (TDD) (Release 6) 3GPP TS 25.221 V6.4.1 (Jun. 2005).
3rd Generation Partnership Project, Technical Specification Group Radio Access Network, Multiplexing and channel coding (TDD) (Release 6) 3GPP TS 25.222 V6.2.0 (Dec. 2004).
3rd Generation Partnership Project, Technical Specification Group Radio Access Network, Spreading and modulation (TDD) (Release 6) 3GPP TS 25.223 V6.0.0 (Dec. 2003).
3rd Generation Partnership Project, Technical Specification Grobp Radio Access Network, Physical layer procedures (TDD) (Release 6) 3GPP TS 25.224 V6.5.0 (Jun. 2005).
3rd Generation Partnership Project, Technical Specification Group Radio Access Network, Physical layer, , Measurements (TDD) (Release 6) 3GPP TS 25.225 V6.1.0 (Mar. 2004).
3rd Generation Partnership Project, Technical Specification Group Radio Access Network, FDD Enhanced Uplink, Overall description, Stage 2 (Release 6) 3GPP TS 25.309 V6.3.0 (Jun. 2005).
3rd Generation Partnership Project, Technical Specification Group Radio Access Network, Feasibility Study on UplinkEnhancements for UTRA TDD (Release 6) 3GPP TR 25.804 V2.0.0 (Feb. 2005).
3rd Generation Partnership Project, Technical Specification Group Radio Access Network, FDD Enhanced Uplink, Physical Layer Aspects (Release 6) 3GPP TR 25.808 V2.0.0 (Mar. 2005).
3rd Generation Partnership Project, Technical Specification Group Radio Access Network, Physical layer aspects ofUTRA High Speed Downlink Packet Access (Release 4) 3GPP TR 25.848 V4.0.0 (Mar. 2001).
3rd Generation Partnership Project. Technical Specification Group Radio Access Network, Feasibility Study considering the viable deployment of UTRA in additional and diverse sectrum arrangements (Release 6) 3GPP TR25.889 V6.0.0 (Jun. 2003).
3rd Generation Partnership Project, Technical Specification Group Radio Access Network, Feasibility Study forEnhanced Uplink for UTRA FDD (Release 6) 3GPP TR 25.896 V6.0.0 (Mar. 2004).

* cited by examiner

APPARATUS AND METHOD FOR COMMUNICATING SIGNALING INFORMATION

CROSS-REFERENCE TO RELATED APPLICATIONS

This application is a divisional application of application Ser. No. 12/906,607 filed by Anderson on Oct. 18, 2010 entitled "Apparatus and Method for Communicating Signaling Information" currently allowed for issuance. Application Ser. No. 12/906,607 is a continuation of U.S. Pat. No. 7,817,613 filed Sep. 30, 2005 by Anderson entitled "Apparatus and Method for Communicating Signaling Information" which claims priority from United Kingdom application GB 0517219.2 filed Aug. 24, 2005. The above filed applications are commonly assigned with the present application and incorporated herein by reference.

TECHNICAL FIELD

The invention relates to signaling in a cellular communication system and in particular, but not exclusively, to signaling of acknowledgement signals in a 3rd Generation Partnership Project (3GPP) cellular communication system.

BACKGROUND

Currently, 3rd generation cellular communication systems are being rolled out to further enhance the communication services provided to mobile users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. In time division multiple access (TDMA) systems user separation is achieved by assigning different time slots to different users. In addition to TDMA, TDD provides for the same carrier frequency to be used for both uplink and downlink transmissions. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In order to provide enhanced communication services, the 3rd generation cellular communication systems are designed to support a variety of different services, including packet based data communication. Likewise, existing 2nd generation cellular communication systems, such as the Global System for Mobile communications (GSM) have been enhanced to support an increasing number of different services. One such enhancement is the General Packet Radio System (GPRS), which is a system developed for enabling packet data based communication in a GSM communication system. Packet data communication is particularly suited for data services which have a dynamically varying communication requirement such as, for example, Internet access services.

For cellular mobile communication systems in which the traffic and services have a non-constant data rate, it is efficient to dynamically share radio resources amongst users in accordance with their needs at a particular instant. This is in contrast to services with constant data rates, where radio resources that are appropriate for the service data rate can be assigned on a long-term basis, such as for the duration of the call.

In the current UMTS TDD standard, uplink shared radio resources may be dynamically assigned (scheduled) by a scheduler in a Radio Network Controller (RNC). However, in order to operate efficiently, the scheduler needs to have knowledge of the volume of uplink data that is waiting for uplink transmission at the individual mobile users. This allows the scheduler to assign resources to users who need them most. In particular, it prevents that resource being wasted by being assigned to mobile stations that do not have any data to send.

Recently, significant effort has been invested in improving specifically uplink performance for 3GPP systems. One way to do this is to move the scheduling entity out of the RNC and into the wireless base stations, communicating to wireless subscriber communication units, such that transmission and re-transmission latencies may be reduced. As a result, a much faster and more efficient scheduling can be achieved. This, in turn, increases perceived throughput by the end-user. In such an implementation, a scheduler located in the base station (rather than in the RNC) assumes control over the granting of uplink resources. Fast scheduling response to a user's traffic needs and channel conditions is desirable in improving the efficiency of the scheduling and the transmission delays for the individual wireless subscriber communication units.

Specifically, in order to achieve an efficient communication of data bits across the air interface, re-transmission of data packets that are not correctly received has been specified for most 3GPP packet data services. In such systems, data re-transmissions are commonplace. So-called hybrid schemes may also be used where signals corresponding to re-transmissions are accumulated with signals from previous transmissions of the same data in the receiver, prior to decoding, in order to iteratively improve the probability of correct decoding of the data. Hybrid and fast re-transmission schemes are typically used because the optimum link efficiency (in terms of the energy required per error-free transmitted bit following re-transmission) is achieved when the probability of error for first-time transmissions is relatively high (e.g., 10% to 50%). However, the air interface transmission delay associated with a re-transmission is very high, as it includes the delay of the acknowledgement feedback process (e.g., the delay of waiting for a possible acknowledgement before deciding to re-transmit) and of the scheduling of re-transmission data packet.

With respect to the uplink multiple access, both FDD and TDD physical layers use spreading (using one or more of a set of so-called channelization codes) followed by a chip scrambling operation. For FDD uplink, each user is allocated a user-specific sequence for the scrambling operation, which, in conjunction with the channelization code spreading, enables the separation of the individual user signals at the base station receiver. Conversely, for TDD all users within a given cell use the same scrambling code. Users in TDD using the same timeslot are thus separable primarily by means of having different physical channelization codes.

The consequence of this difference in uplink scrambling code assignment between FDD and TDD modes is that the finite set of channelization code resources must be shared out between contending users belonging to the same TDD cell, whereas in FDD, users in the same cell can use the same channelization codes subject to some restrictions on the number of codes used and their spreading factors.

In the context of the enhanced uplink systems in 3GPP, scheduling of the user's uplink transmissions is performed by the base station. A low-latency retransmission scheme is supported in which the base station sends a fast acknowledgement indicator back to the wireless subscriber communication unit pertaining to a specific block of transmitted bits. If the transmission of the data block was received in error, the indicator is set to 'NACK' (Negative Acknowledgment) by the base station and upon receipt of the transmitted indicator the wireless subscriber communication unit knows that the data is to be re-transmitted. If the transmission of the data block was received without error, the indicator is set to 'ACK' (Acknowledgment) by the base station and upon its receipt, the wireless subscriber communication unit knows that the data sent has been correctly received and can select new data for transmission in any forthcoming scheduling grants made by the base station.

The channel used to carry the ACK/NACK from the base station to the wireless subscriber communication unit is termed the E-HICH (Enhanced Uplink Hybrid ARQ Indicator Channel). This channel is necessarily a low-data-rate channel since it carries only one bit of information for each user active in the time instant. For FDD enhanced uplink, if the wireless subscriber communication unit was not active for a particular time instant, there is no need to send an acknowledgement and no acknowledgement is sent (nor is the wireless subscriber communication unit expecting to receive one).

For FDD, the way in which the acknowledgement indicator is encoded onto the E-HICH channel is by means of assigning a user-specific sequence of length '40' to each user using enhanced uplink services in the cell. Notably, the sequence is assigned for the duration of the enhanced uplink "call". During the quiet periods between bursts of uplink transmission, the code remains assigned to a particular user and cannot be re-used by other users. This effectively limits the possible active-user population size to 40 per E-HICH. Each E-HICH for FDD uses a spreading-factor 128 channelization code and thus consumes $1/128^{th}$ of the available downlink code resources (note: unlike the uplink, the scrambling code is cell-specific in the downlink direction for FDD). If the population or user-base exceeds 40, a further E-HICH must be configured, thereby consuming a further $1/128^{th}$ of the available downlink code resources, and so on.

A further problem that has compounded the efficient use of valuable resources is that in recent times there has arisen a desire for "always-on" internet connectivity in which users can be held in an active state (ready to transmit or receive communication from the internet without a need to reconfigure the communication state and incur the associated transmission latency penalties). For a wireless mobile communication system, when in this "ready" state, it is thus imperative that users consume as few system resources as possible when no actual data traffic is being sent or received. This enables the number of users that may be held at any time in the ready state to be maximized.

For the FDD enhanced uplink system, when a user is in this "ready" state, each user unfortunately consumes valuable downlink code resources, since a user-specific sequence has been assigned and reserved for the transmission of the acknowledgement indicator, should the need arise.

Thus, current signaling techniques are suboptimal. For example, when only a few users are actively transmitting uplink data at any one time, and the remainder of the users are inactive, any long-term allocation of downlink code resource to each user (irrespective of their activity state) for the purposes of acknowledgement signaling is wasteful of system resources.

Hence, improved signaling in a cellular communication system would be advantageous. In particular a system allowing for the provision of an improved acknowledgement process would be advantageous.

SUMMARY OF THE INVENTION

Accordingly, the invention seeks to preferably mitigate, alleviate or eliminate one or more of the abovementioned disadvantages singly or in any combination.

One aspect of the disclosure provides a wireless subscriber communication unit for operation in a cellular communication system having a plurality of shared uplink transmission resources divided into sets of mutually exclusive uplink transmission resources, and a plurality of shared downlink transmission resources divided into sets of mutually exclusive downlink transmission resources. The shared uplink transmission resources are defined in terms of codes and timeslots. In one embodiment, the wireless subscriber communication unit comprises a receiver unit, a control unit, and a transmitter unit. The receiver unit is configured to receive scheduling information including an assignment of a scheduled uplink transmission resource from the shared uplink transmission resources from a network infrastructure apparatus. The control unit is configured to derive an uplink resource identifier related to the scheduled uplink transmission resource from the received scheduling information. The transmitter unit is configured to transmit an uplink transmission using the scheduled uplink transmission resource, the up-link transmission including the uplink resource identifier. The control unit is configured to receive a downlink transmission associated with the uplink transmission on a downlink transmission resource determined from at least one of the received scheduled uplink resource or uplink resource identifier.

Another aspect of the disclosure provides a method of receiving signaling information in a cellular communication system having a plurality of shared uplink transmission resources divided into sets of mutually exclusive uplink transmission resources, and a plurality of shared downlink transmission resources divided into sets of mutually exclusive downlink transmission resources. The shared uplink transmission resources are defined in terms of codes and timeslots. In one embodiment, the method comprises receiving scheduling information, deriving an uplink code resource identifier, transmitting an uplink transmission, and receiving a downlink transmission. The received scheduling information includes an assignment of a scheduled uplink transmission resource from the shared uplink transmission resources from a network infrastructure apparatus. The derived uplink code resource identifier is related to the scheduled uplink transmission resource from the received scheduling information. The uplink transmission uses the scheduled uplink transmission resource and includes the uplink resource identifier. The received downlink transmission is associated with the uplink transmission on a downlink transmission resource determined from at least one of the received scheduled uplink resource or uplink resource identifier.

BRIEF DESCRIPTION OF THE DRAWINGS

Embodiments of the invention will be described, by way of example only, with reference to the accompanying drawings, in which.

DETAILED DESCRIPTION

The following description focuses on embodiments of the invention applicable to a UMTS (Universal Mobile Telecommunication System) cellular communication system and in particular to a UMTS Terrestrial Radio Access Network (UTRAN) operating in a Time Division Duplex (TDD) mode. However, it will be appreciated that the invention is not limited to this particular cellular communication system, but may be applied to other cellular communication systems. In this regard, in one embodiment of the invention, the cellular communication system supports a plurality of shared uplink transmission resources that is divided into sets of mutually exclusive transmission resources.

Figure 1:
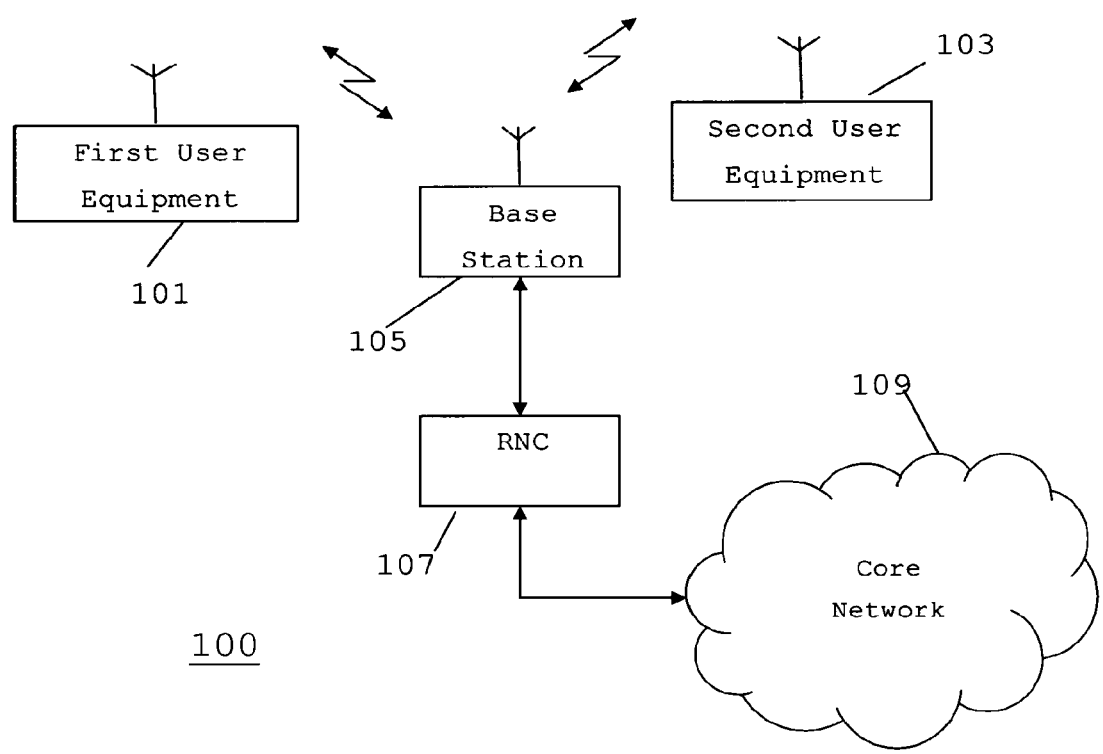
FIG. 1 illustrates an example of a cellular communication system in which some embodiments of the invention may be employed.

FIG. 1 illustrates an example of a cellular communication system 100 in which embodiments of the invention may be employed. In one embodiment of the invention, the cellular communication system 100 supports a plurality of shared uplink transmission resources that is divided into sets of mutually exclusive transmission resources. The shared uplink transmission resources may be defined in terms of codes and timeslots. In this context, codes may refer to CDMA spreading sequences or scrambling sequences, or to generic time-frequency codes in a time/frequency division multiplexed system. There exist a finite number of codes and timeslots, and thus any one unit within the total shared resource space is defined by the timeslot/code co-ordinate pair. These individual non-overlapping units of shared resource may further be grouped together to form larger units of assignable resource.

In a cellular communication system 100, a geographical region is divided into a number of cells each of which is served by a base station 105. The base stations, sometimes referred to as Node Bs, are interconnected by a fixed network which can communicate data to/from and between the base stations and a core network 109. A wireless subscriber communication unit 101, 103 is served via a radio communication link with the base station 105 of the cell within which the wireless subscriber communication unit is located. The wireless subscriber communication unit is often referred to as a mobile station (MS) or user equipment (UE), which are deemed inter-changeable terms.

A wireless subscriber communication unit may be, for example, a remote unit, a mobile station, a communication terminal, a personal digital assistant, a laptop computer, an embedded communication processor or any communication element communicating over the air interface of the cellular communication system 100.

As a wireless subscriber communication unit 101, 103 moves, it may move from the communication coverage supported by one base station 105 to the coverage supported by another, i.e., from one cell to another. As the mobile station 101, 103 moves towards a base station 105, it enters a region of overlapping coverage of two base stations and within this overlap region it changes to be supported by the new base station. As the mobile station moves further into the new cell, it continues to be supported by the new base station. This is known as a handover or handoff of a mobile station between cells.

A typical cellular communication system extends coverage over typically an entire country and comprises hundreds or even thousands of cells supporting thousands or even millions of mobile stations. Communication from a mobile station to a base station is known as uplink, and communication from a base station to a mobile station is known as downlink.

The base station 105 is coupled to a radio network controller (RNC) 107. An RNC 107 performs many of the control functions related to the air interface, including radio resource management and routing of data to and from appropriate base stations.

The RNC 107 is coupled to a core network 109. A core network interconnects RNCs and is operable to route data between any two RNCs, thereby enabling a wireless subscriber communication unit in a cell to communicate with a wireless subscriber communication unit in any other cell. In addition, a core network 109 typically comprises gateway functions for interconnecting to external networks, such as the Public Switched Telephone Network (PSTN), thereby allowing wireless subscriber communication units to communicate with landline telephones and other communication terminals connected by a landline. Furthermore, the core network 109 comprises much of the functionality required for managing a conventional cellular communication network, including functionality for routing data, admission control, resource allocation, subscriber billing, mobile station authentication, etc.

It will be appreciated that, for clarity and brevity only, the specific elements of the cellular communication system 100 required for the description of some embodiments of the invention are shown, and that the cellular communication system 100 may comprise many other elements, including other base stations and RNCs as well as other network entities, such as SGSNs, GPRS Gateway support Nodes (GGSNs), home location registers (HLRs), visitor location registers (VLRs), etc.

Conventionally, the scheduling of data over the air interface is performed by the RNC 107. However, recently packet data services have been proposed that seek to exploit the fluctuating channel conditions when scheduling data over a shared channel. Specifically, a High Speed Downlink Packet Access (HSDPA) service has recently been standardized by 3GPP. HSDPA allows scheduling to be performed that takes the downlink conditions for the individual UEs into account. Thus, data may be scheduled for UEs when channel propagations allow with low downlink resource usage. However, in order to enable this scheduling to be sufficiently fast to follow the dynamic variations, HSDPA requires that the scheduling is performed at the base station rather than by the RNC. Locating a scheduling function in the base station eliminates some components of the communication over the base station to RNC interface (the Iub interface) thereby reducing the significant delays associated therewith, notably in the case of re-transmissions.

In the context of the enhanced uplink system, the uplink scheduling function is similarly moved from the RNC into the base station. In such systems, an acknowledgement signal is transmitted on the downlink to inform the transmitter (UE) of the reception status of the transmitted data packets. Advantageously, in one embodiment of the invention, the method of this signaling facilitates substantially zero use of downlink code resources for "ready-but-inactive" users. Thus, the method thereby facilitates maintenance of a large number of users in the ready state, increasing system efficiency and providing the "always-on" internet experience for an increased user base.

The method takes advantage of the fact that users share channelization code resources on uplink for TDD (not so for FDD in 3GPP). Uplink data is transmitted in blocks during pre-determined time periods known to both the user and the base station. These time periods are referred to as TTI's (Transmission Time Intervals) and may comprise multiple timeslots. For TDD, the TTI is 10 msec and is aligned with the msec radio frame timing. One data block is transmitted per TTI and one acknowledgement indicator is returned per data block.

Figure 2:
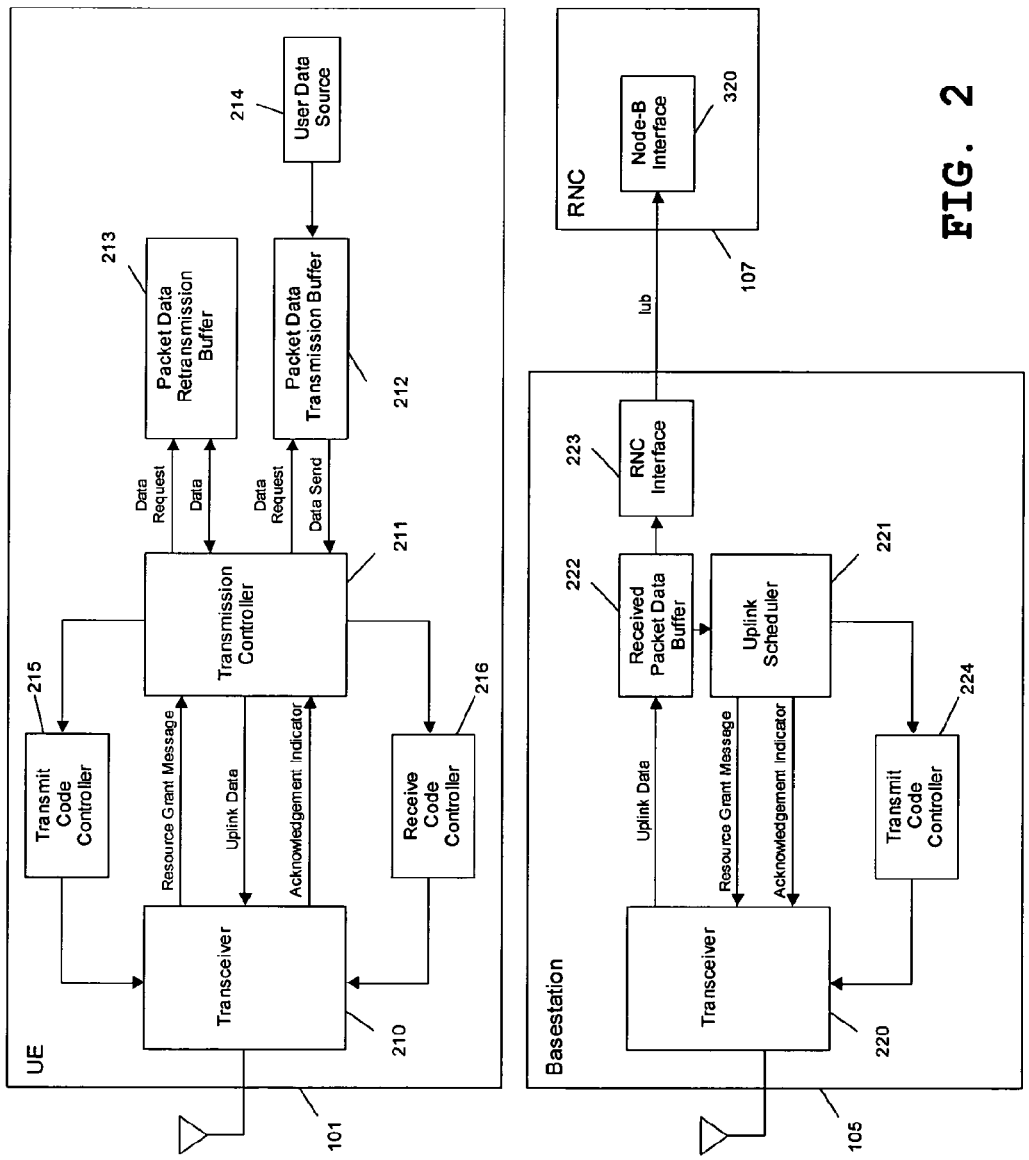
FIG. 2 illustrates a UE, an RNC and a base station in accordance with some embodiments of the invention.

The base station scheduler is responsible for sharing out the uplink timeslot and channelization code resources between contending users for each TTI, as described further with regard to FIG. 2. Each user scheduled to be active in a given TTI is granted a portion of the available uplink timeslot and code resources. In one embodiment of the invention, the minimum resource unit (RU) is a single spreading-factor (SF)-16 code in a single timeslot. Multiple of these minimum transmission units may be combined to form a larger allocation of resource in any one TTI.

In one embodiment of the invention, multiple RU's may be allocated to a user in the form of multiple timeslots, or multiple codes, albeit that the current 3GPP specifications allow only up to two simultaneous codes in a given timeslot. Alternatively, one or more channelization codes with lower or higher, for example multiples of SF16, spreading factor may be assigned (e.g., SF8, SF4, SF2, and SF1) in one timeslot. Due to the structure of the OVSF channelization codes used in 3GPP, multiple codes of higher spreading factor may subtend a common code with lower spreading factor. This situation is shown later in FIG. 7, which illustrates an example of a CDM E-HICH burst structure in accordance with some embodiments of the invention, whereby $CQ^i$ denotes the channelization code with spreading factor Q and index i=1 ... Q.

Allocation of a first code with a first spreading factor precludes allocation to any other UE of any codes of spreading factor higher than the first spreading factor that subtend the first code. Thus, the codes assigned to users within the assignable shared uplink transmission resource space are exclusively designated for use by a single user in a given TTI.

In terms of the total uplink resource space, this is defined in two dimensions—timeslots and codes. For a given TTI, there is a certain number of constituent timeslots available and a certain amount of code resources available to share amongst the contending users. There are therefore a certain number of resource units (RUs) available per TTI.

In the following, some embodiments are described wherein an efficient transmission of acknowledgement/negative-acknowledgment (ACK/NACK) signals is proposed. Thus, some embodiments result in improved scheduling performance; improved end user perceived quality of service and/or improved performance of the cellular communication system as a whole.

FIG. 2 illustrates the UE 101, the RNC 107, and the base station 105 of the example cellular communication system of FIG. 1 in more detail. The base station 105 comprises an uplink scheduler 221 for scheduling of uplink transmission resources to active users in the cellular communication system. Uplink transmission resources are granted by means of sending a resource grant message from the uplink scheduler 221, via the base station transceiver 220, to the UE 101. The UE 101 receives the resource grant message via its transceiver 210, and the grant information is passed to the UE transmission controller 211. The transmission controller 211 is responsible for selecting data from either a packet data transmission buffer 212, or from a packet data re-transmission buffer 213. User data for transmission is fed from the user data source 214 into the packet data transmission buffer 212, as required. The transmission controller 211 is also able to move data from the packet data transmission buffer 212 into the packet data re-transmission buffer 213, in the event that a negative acknowledgement indication has been received from the base station 105 pertaining to that data packet.

On receipt of a transmission resource grant message, the transmission controller 211 thus selects data from the transmission buffer 212 or re-transmission buffer 213 as appropriate. Often it may be preferable to prioritize re-transmissions ahead of transmissions. The transmission controller 211 transmits the data packet on the assigned uplink resource(s), via transceiver 210, to base station 105.

The code resources used for the transmission is/are configured by a transmit code controller 215, which has been informed of the granted uplink code resources by the transmission controller 211. The transmission controller 211 also communicates the transmission resource grant message to the receive code controller 216, which uses the information to derive a receive code on which any 'acknowledgement' indicator pertaining to the transmitted packet will be received.

In one embodiment, the assigning of at least one downlink code sequence associated with a derived uplink code resource identifier is dynamically assigned and re-assigned for a short period of time (for example, substantially of the order of a single radio frame or TTI—10 milliseconds).

The base station 105 receives the transmitted data packet on the resources previously granted and the data is passed to the received packet data buffer 222. Information regarding the error status of the received packet is also conveyed to the uplink scheduler 221. Correctly received uplink data packets are transferred to the RNC 107, via a base station to RNC interface 223 and via the Iub interface. They are received by the RNC 107 via the Node-B interface 320. The uplink scheduler 221 may make further resource grants, in order to try to recover the erroneous data via a re-transmission process.

In either case, an acknowledgment indicator is generated according to whether or not the data packet was received in error. If reception was deemed to be successful, a positive acknowledgement (ACK) is transmitted via transceiver 220. Otherwise a negative acknowledgement (NACK) is transmitted.

When deciding to grant uplink resources, the uplink scheduler 221 also informs the transmit code controller 224 of the uplink code resources allocated. The transmit code controller 224 uses the information to derive a downlink code resource for transmission of the corresponding acknowledgement indicator. When the acknowledgment indicator is transmitted, the downlink code resources that it uses is/are configured by the transmit code controller 224, and are thus associated with the uplink resource(s) allocated for the transmission pertaining to the acknowledgement indicator.

The transceiver 210 in UE 101 has been pre-configured by the receive code controller 216 to detect the acknowledgement indicator transmitted by the base station 105. This pre-configuration of the receive code resources may be enabled via a previous reception of the original uplink resource grant and a known mapping in the UE between uplink code resources used for transmission and downlink code resources used for reception of the acknowledgment indicator. Thus, and advantageously, no long-term assignment of downlink code resources is required and downlink code resources are only used when uplink code resources are used (i.e., when active uplink transmission occurs). Furthermore, any additional signaling overhead to assign downlink code resources, which may degrade system capacity, is avoided.

In embodiments of this invention, a base station 105 is provided that transmits signaling information in a time division duplex TD-CDMA cellular communication system. The base station 105 comprises means for receiving an uplink transmission from a wireless subscriber communication unit 101, such as a user equipment (UE). Notably, the base station 105 comprises means for deriving an uplink code resource identifier from the uplink transmission. The base station 105 further comprises means for assigning at least one downlink code sequence used to carry downlink signaling information associated with the derived uplink code resource identifier and means for transmitting a downlink transmission comprising the at least one downlink code sequence to the UE 101.

In one embodiment, the base station 105 associates an acknowledgement indicator code sequence with the code resources used in the corresponding uplink transmission. In the context of ACK/NACK transmissions, this embodiment aims to resolve the aforementioned disadvantages associated with per-user code reservation in existing 3GPP FDD enhanced uplink systems within the context of a 3GPP TDD system.

Figure 3:
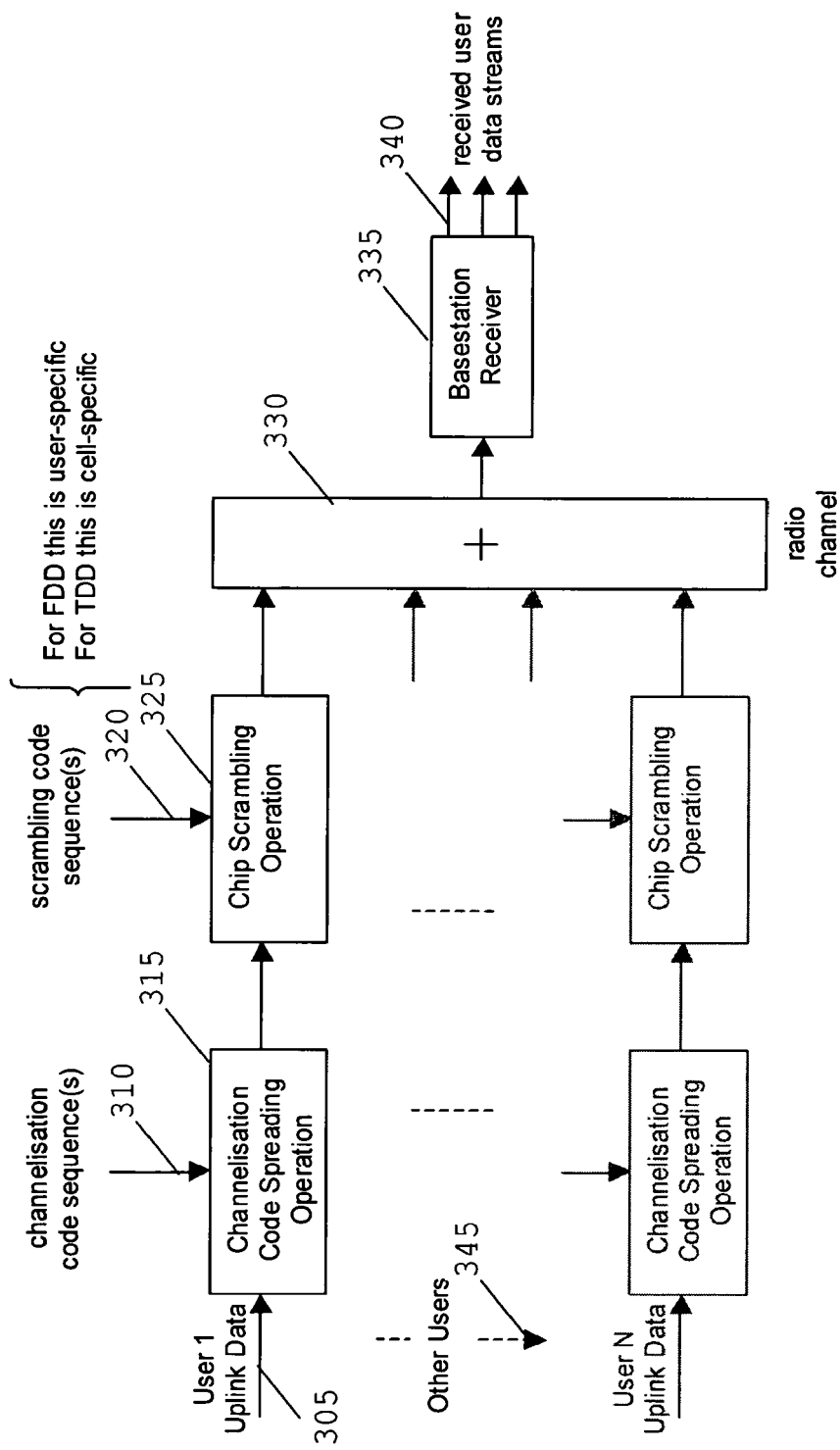
FIG. 3 illustrates an example of using channelization and scrambling codes to generate a data stream in accordance with some embodiments of the invention.

FIG. 3 illustrates an example of using channelization codes 315 and scrambling codes 325 to generate a data stream 340 in accordance with some embodiments of the invention.

On a per user 305, 345 basis, uplink data is transmitted with one or more channelization code sequence(s) 310 by the wireless subscriber communication unit to generate a channelization code spreaded signal. The channelization code spreaded signal is multiplied with a scrambling code sequence 320 within a chip scrambling function 325 to generate a transmit signal. The transmit signal is then sent over the radio channel 330 to a base station receiver 335, which de-multiplexes the received user data streams 340.

Figure 4:
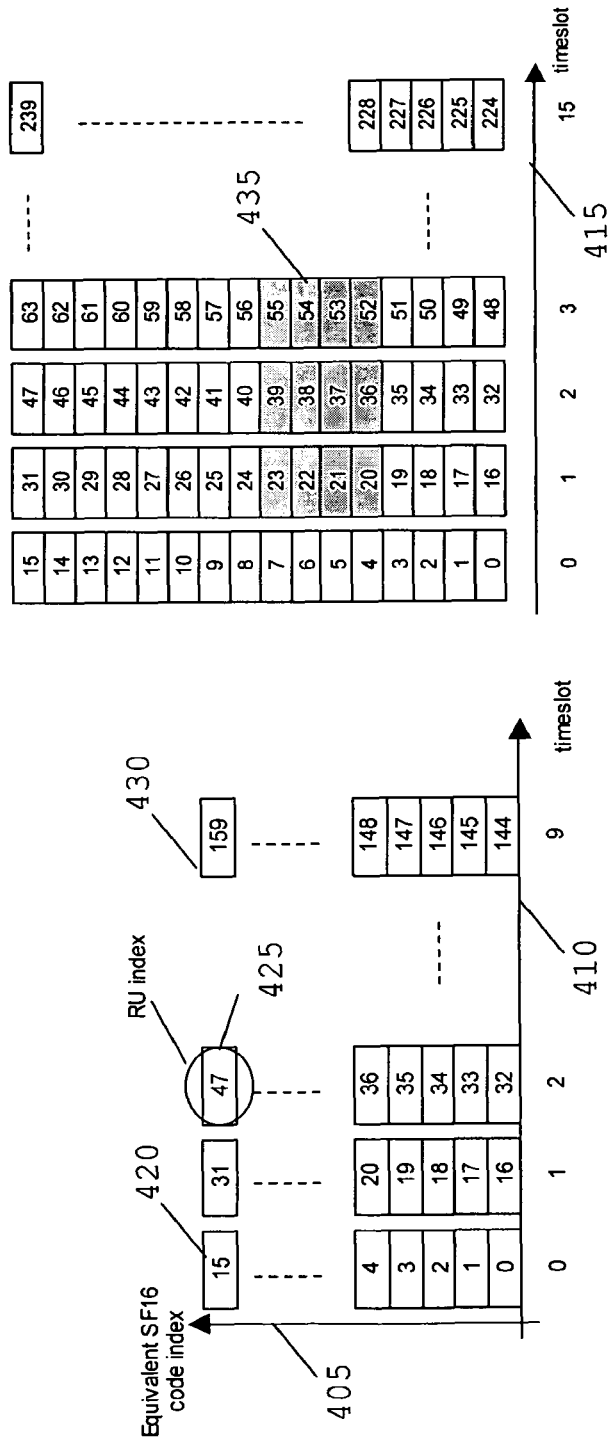
FIG. 4 illustrates an example of resource unit numbering in accordance with some embodiments of the invention.

FIG. 4 illustrates an example of resource unit numbering in accordance with some embodiments of the invention. FIG. 4 shows an example of a situation in which, say, ten timeslots 410 are available per radio frame for enhanced uplink TTI transmissions. The full resource space (of size '16') 405 is available in each timeslot 410. Hence, there are a total number of '160' RUs 430, numbered '0' to '159'.

The base station scheduler implicitly knows which wireless subscriber communication units (UE's) have been assigned which timeslot and code resources for each TTI. For 3GPP TDD, these resource assignments are signaled to the UE in a downlink signaling channel (termed the E-AGCH in 3GPP—the Enhanced Uplink Absolute Grant Channel). Given that the resource allocation assignments given to each user cannot overlap with those assigned to another user, a unique resource index or "tag" may be associated advantageously with each actively-transmitting user in a given TTI.

The tag may correspond to any resource unit index, such as RU index '47' 425, assigned to the user (since that resource unit index may not have been assigned to any other user in the same TTI). For simplicity's sake, it is assumed here that the tag is set equal to the lowest numbered RU allocated to the UE for the TTI of interest.

Thus, for example, if a UE were allocated the following code resources for a specific TTI in a sixteen timeslot arrangement:
1×SF4;
channelisation code index 2;
designated enhanced-uplink timeslots 1,2,3;
then the tag assigned to that transmission would be number '20' 435, i.e., the lowest-numbered RU. This is thus the lower left hand corner of the allocated resources in FIG. 4 (allocated resources are shown as shaded boxes). Note that, in this example, the single allocation of one spreading-factor-4 code in each of 3 timeslots has occupied 4 minimum resource units (RU's) per timeslot. This is because an RU is defined in this example as a single spreading-factor-16 code, and four of these subtend a spreading-factor-4 code in the OVSF code tree.

In one embodiment of this invention, the resource tag associated with a user's uplink transmission in a given TTI is used by both base station and wireless subscriber communication unit to derive a code sequence index that corresponds to a code used to convey the subsequent acknowledgement information pertaining to the previous uplink transmission. Thus, the base station knows on which code to transmit the acknowledgement indicator and the wireless subscriber communication unit knows when and where to expect this transmission and how to decode it.

This method avoids the need for a code to be reserved on a long-term basis for a particular user. Advantageously, only actively-transmitting users occupy acknowledgement indictor code resources.

It is envisaged that the method may be applied to any communication system where the code resources on the uplink channel are individually assigned. For example, should the channelization code resources in FDD Enhanced Uplink be amended to a per-user form, the aforementioned embodiments may be used.

In one embodiment, the TDD E-HICH is a physical channel, transmitted once per TTI in a single timeslot and configured to carry ACK/NACK information. Advantageously, the ACKINACK information is synchronously related to the Enhanced Uplink TTI transmissions from a set of users.

Figure 5:
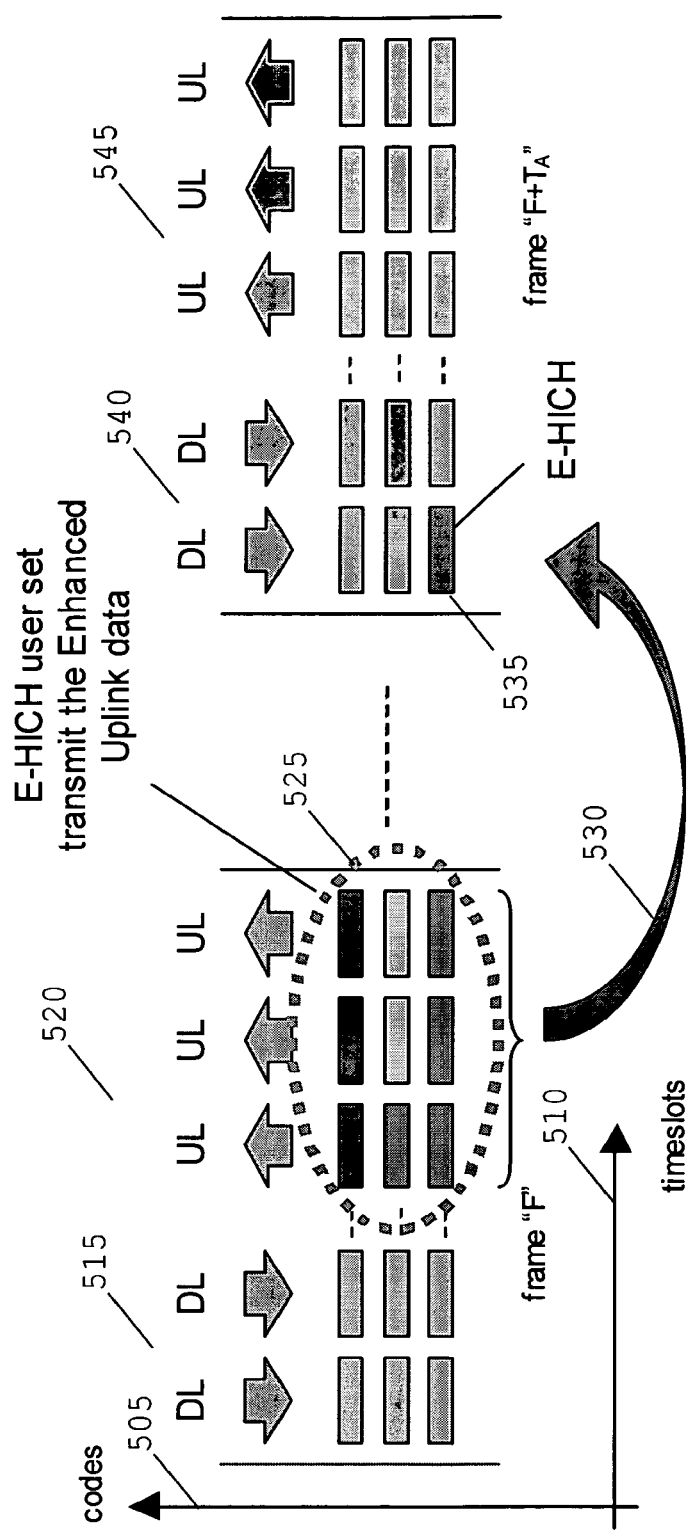
FIG. 5 illustrates an example of E-HICH timing association with an enhanced uplink transmission in accordance with some embodiments of the invention.

This situation is shown in FIG. 5, which illustrates an example of E-HICH timing association with an enhanced uplink transmission in accordance with some embodiments of the invention. The timing association is illustrated as codes 505 versus timeslots 510. For a particular frame 'F', there are a number of downlink transmissions 515 and a number of uplink transmissions 520.

In one embodiment of the present invention, the (single) E-HICH physical channel uses a SF16 spreading code, in a single downlink timeslot, per transmission time interval (TTI). The E-HICH physical channel carries the acknowledgment indicators, one for each of the E-HICH user set 525. The indicators are code-division-multiplexed (CDM) within the single SF16 code.

The set of users for whom ACK/NACK information is transmitted on a particular E-HICH is termed the "E-HICH user set". These are the active users. That is to say that, for Enhanced Uplink transmissions 520 in TTI (or frame) "F", the ACK/NACK is returned 530 on the E-HICH 535 downlink timeslot 540 in TTI (or frame) "F+$T_A$". Frame "F+$T_A$" will thus comprise the E-HICH downlink transmission(s) 540 comprising the ACK/NACK indicators relating to the uplink transmissions of frame "F" and may additionally comprise further uplink transmissions 545.

Although the embodiment described is in the context of CDM of the acknowledgement indictors on the E-HICH channel, it is envisaged that alternative embodiments may be used wherein the acknowledgement indicators are time division multiplexed (TDM) onto the E-HICH channel. Certain advantages of the CDM scheme over the TDM scheme may exist due to the CDM embodiment's inherent ability to enable per-user power control, whilst keeping the average slot power constant and equal to the midamble power.

Thus, according to one embodiment of the invention, there is provided a wireless communication protocol supporting a downlink transmission from a base station to a wireless subscriber communication unit whereby the downlink transmission comprises at least one downlink code sequence associated with a derived uplink code resource identifier related to a previous uplink transmission or a previous grant message.

Figure 6:
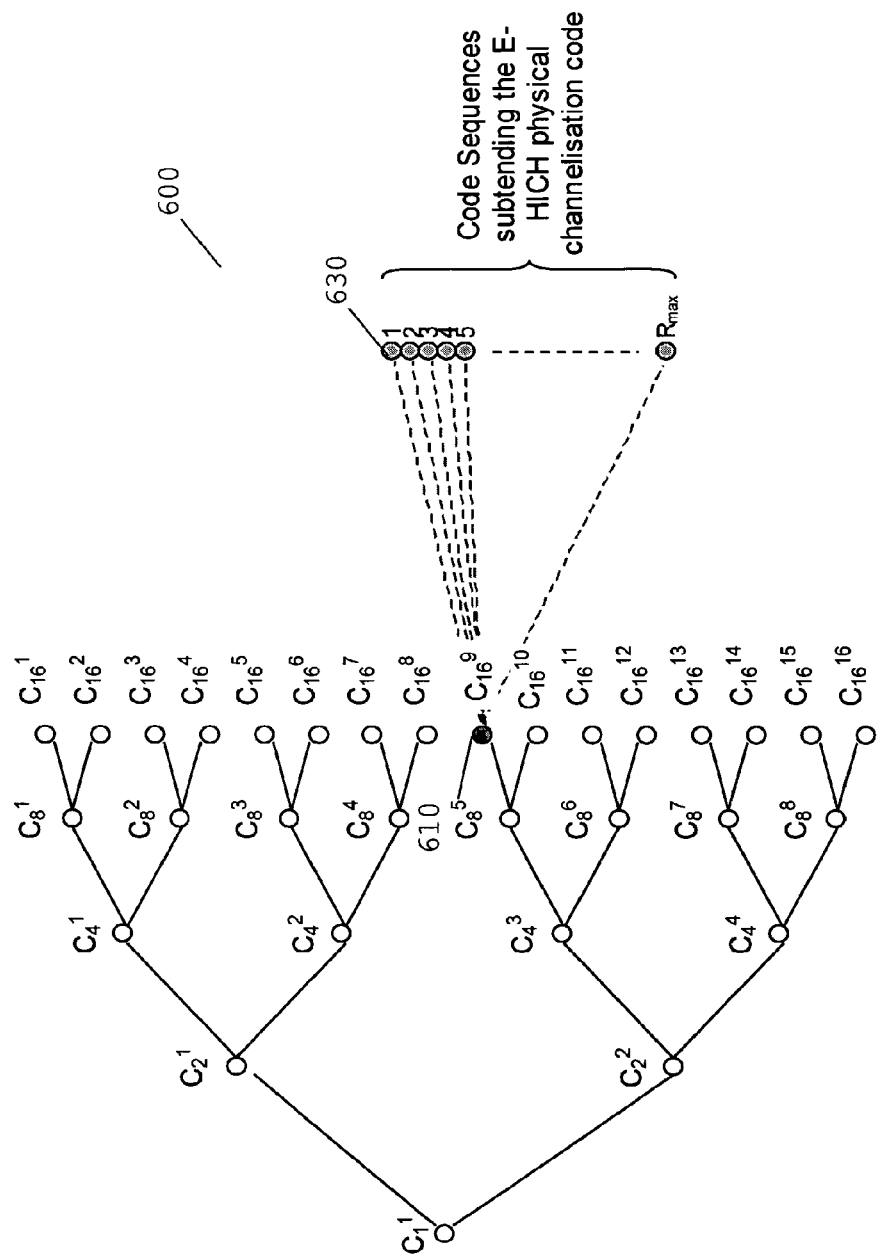
FIG. 6 illustrates an example of an extension to an Orthogonal Variable Spreading Factor (OVSF) code tree in accordance with some embodiments of the invention.

In the context where a downlink code $C_{16}^{9}$ 630 is assigned to the E-HICH, one embodiment of the invention can be viewed as an extension to the OVSF code tree 600, as shown in FIG. 6. There are a total of $R_{max}$ available orthogonal sequences 630 subtending the E-HICH code 610. $R_{max}$ is greater than, or equal to, the total number of shared uplink transmission resource units assignable in the system per TTI for enhanced uplink transmission within the cell.

Figure 7:
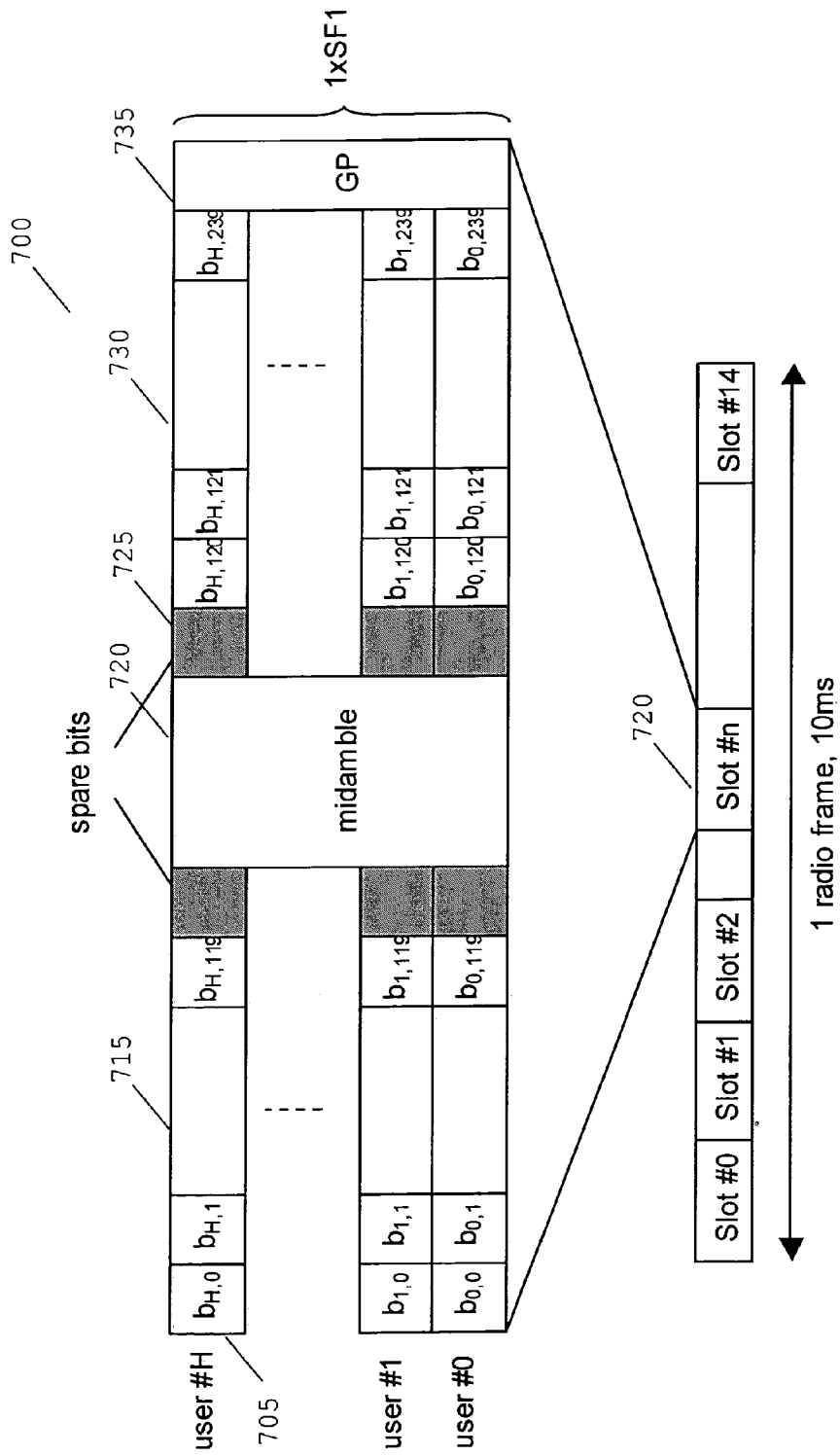
FIG. 7 illustrates an example of a Code Division Multiplexed (CDM) E-HICH burst structure in accordance with some embodiments of the invention.

In one embodiment, the CDM E-HICH burst structure 700 may be configured as shown in FIG. 7. As for normal TDD bursts, there are two payload portions 715, 730 per user 705 separated by a midamble portion 720. Spare bits 725 differentiate the payload portions 715, 730 from the midamble portion 720. A guard period (GP) 735 is inserted at the end of the burst.

In this embodiment, a total of '240' orthogonal sequences are instantiated for TDD, such that the RU numbering spans both uplink and downlink portions of the frame (16 resource units in each of 15 timeslots per radio frame/TTI). This arrangement is therefore not affected by a particular frame configuration or Uplink (UL)/Downlink (DL) split points, and so forth. The choice of '240' also provides a good fit to the payload capacities of the SF16 E-HICH physical channel ('244' bits for burst type '1' and '276' bits for burst type '2' in a 3GPP context), with low wastage of payload resource, but enabling the same structure to be employed for both burst types.

The choice of '240' also enables a flexible choice of the orthogonal code sets. In one embodiment of the present invention, in order to avoid a need to store the full code set of '240'×'240' (equivalent to 57.6 kbits), it is desirable that the length-240 codes can be generated "on-the-fly". In one embodiment, the length-240 codes may be generated by simple arithmetic means.

Figure 8:
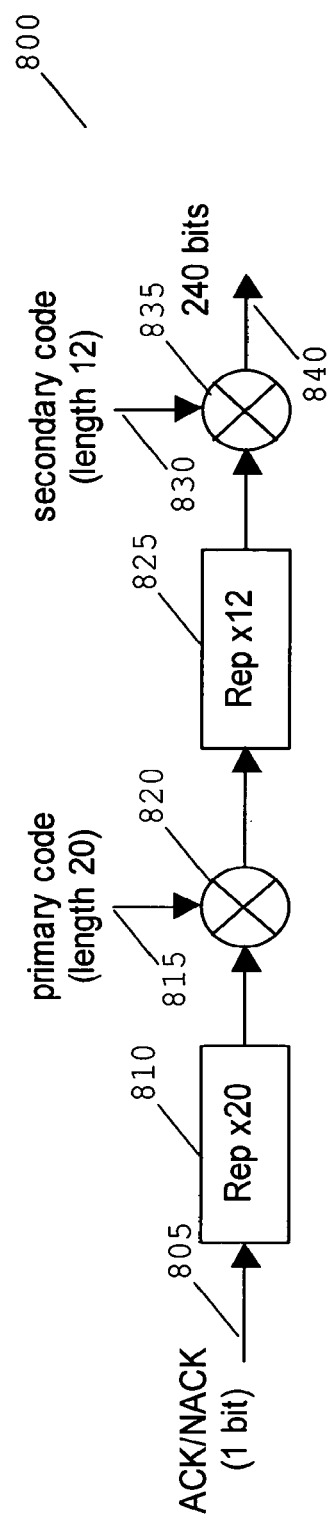
FIG. 8 illustrates a serialized two-stage spreading operation in accordance with some embodiments of the invention.

Advantageously, and in an alternative embodiment, it is envisaged that the length-240 codes may be generated from smaller code sets. Here, for example, the choice of '240' allows for a serialized two-stage spreading process 800 to be used, as illustrated in FIG. 8. This may reduce UE complexity and memory requirements.

For example, the embodiment illustrated in FIG. 8 uses a serialized two-stage spreading operation, employing serial coding with two shorter orthogonal sequence sets, in order to generate the length '240' codes. Thus, FIG. 8 illustrates, in accordance with some embodiments of the invention, a 1$^{st}$ spreading stage with spreading factor length of '20' bits and a 2nd spreading stage with spreading factor length of '12' bits.

Here, an acknowledgement or negative-acknowledgement single bit 805 is input to a first repetition block 810, where the single bit 805 is repeated twenty times. This repeated sequence is input to a first multiplying function 820, where it is multiplied with a primary code length of '20' 815.

The multiplied, repeated sequence is then input to a second repetition block 825, where the repeated sequence is repeated twelve times. This repeated sequence is input to a second multiplying function 835, where it is multiplied with a primary code length of '12' 830. The subsequent output 840 is the desired 240 bit code set.

Thus, this embodiment provides an efficient low complexity implementation, in which the UE need only store one '12'×'12' code set and one '20'×'20' code set. Advantageously, this is significantly less than '240'×'240'. Thus, in this embodiment, a common signature sequence length '240' is used, irrespective of burst type, which simplifies the implementation in the UE. With the payload sizes for a burst type '1' and a burst type '2' being 244 bits and 276 bits respectively, there are consequently four spare bits for burst type '1' and thirty six spare bits for burst type '2'. The processing gain loss, due to these unused "spare" bits is relatively small (i.e., determined as being 0.07 dB and 0.6 dB respectively).

A skilled artisan will appreciate that more stages than a two-stage process may be used. It is also envisaged that alternative code sets may be used, dependent upon the application being targeted and the UE complexity reduction and memory requirements to be used.

Figure 9:
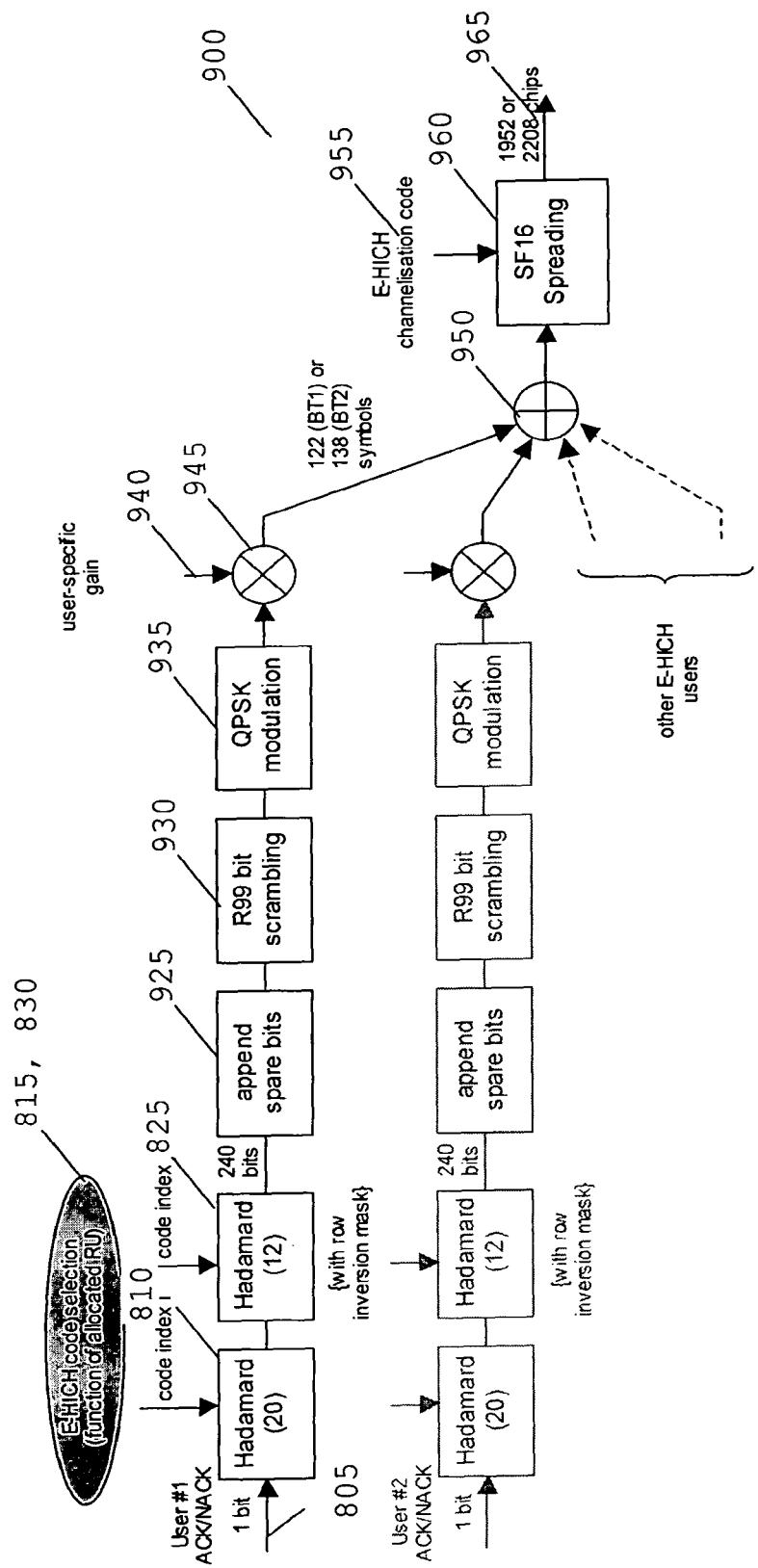
FIG. 9 illustrates a CDM transmitter structure for TDD E-HICH in accordance with some embodiments of the invention.

A Code Division Multiplexed (CDM) transmitter structure 900 for TDD E-HICH, in accordance with some embodiments of the invention, is shown in FIG. 9. In accordance with one embodiment, as illustrated in FIG. 9, the primary code 815 may be constructed from the rows of a Hadamard matrix of order '20'. The secondary code 830 may be similarly constructed from the rows of a Hadamard matrix of order '12'.

The code indexes 815,830 used in conjunction with the Hadamard matrices (i=0 . . . 19 for the primary code set and j=O . . . 11 for the secondary code set) are derived as follows:

$$i = \left[\frac{r}{12}\right] \quad [1]$$

$$j = r \bmod 12 \quad [2]$$

where "r" is the aforementioned resource index tag.

Furthermore, in some embodiments as shown in FIG. 9, row inversion modifications and scrambling codes may be applied, for example using the 3GPP Release 99 bit-scrambling procedure 930, to the Hadamard code sets 815, 830. Such row inversion modifications and scrambling codes may be applied after appending 925 any unused (spare) bits. The row inversion modifications and scrambling codes may be used to improve their properties in terms of peak to mean power and to provide protection against Doppler effects.

Following the application of the R99 bit scrambling code, the signal is quadrature phase shift key (QPSK) modulated 935. The QPSK modulated signal is then multiplied in multiplier function 945 with a user specific gain 940. The resultant signal is then multiplexed with other user's signals in multiplexer function 950. An E-HICH channelization code 955 is then applied to the multiplexed signals in a spreading function 960 that applies a SF16 spreading code in one embodiment. The output signal is a CDMA transmit signal 965 of '1952' or '2208' chips, into which one or more midamble sequences may subsequently be inserted.

Figure 10:
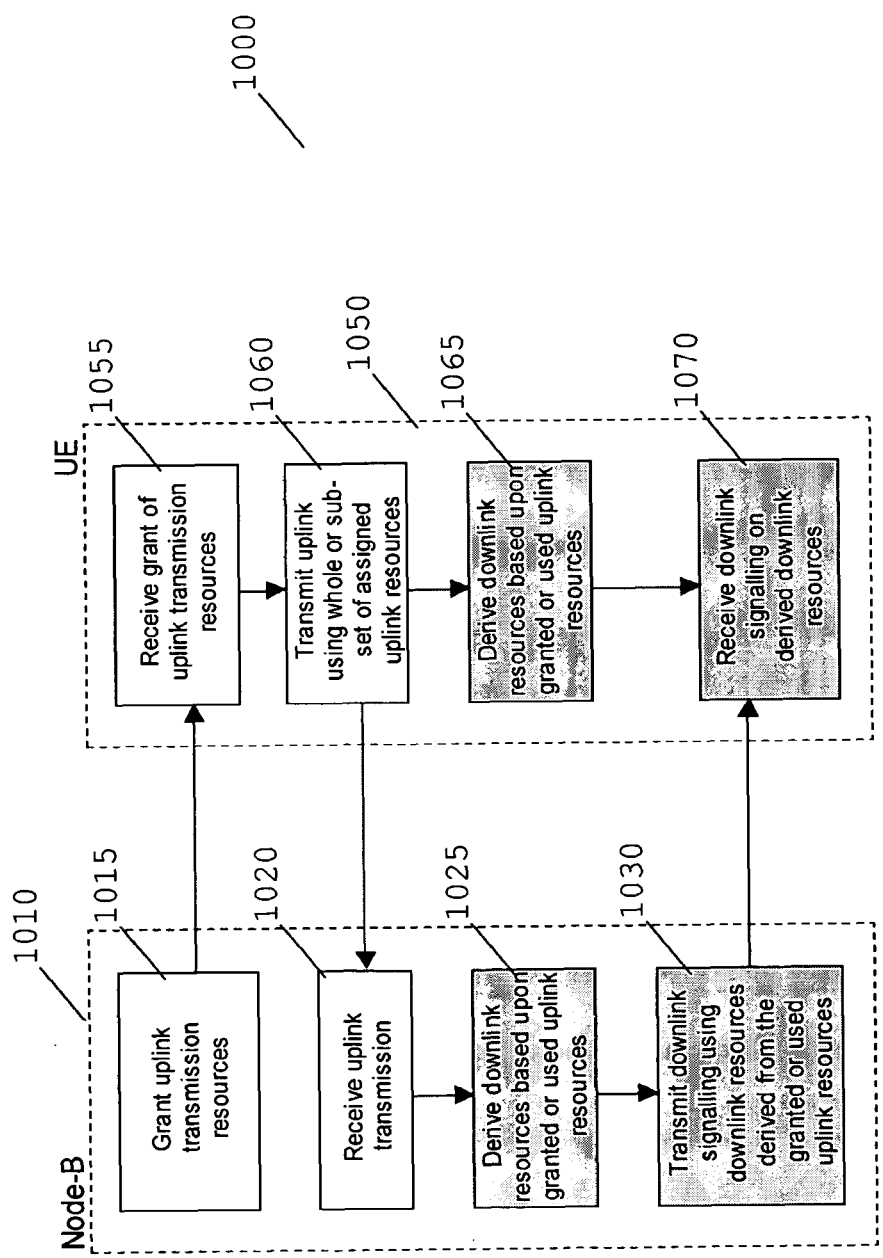
FIG. 10 illustrates a method of transmitting and receiving signaling information in accordance with some embodiments of the invention.

In one embodiment of the present invention, a method 1000 of transmitting and receiving signaling information in a cellular communication system is described, as illustrated in FIG. 10. The method comprises the communication steps between a wireless subscriber communication unit 1050, such as a user equipment and a base station 1010, such as a Node B.

The method comprises the Node B 1010 granting one or more uplink transmission resources to the UE 1050 in step 1015. The UE 1050 receives the grant of one or more uplink transmission resources, in step 1055. The UE 1050 then transmits an uplink message using all, or a subset, of the assigned uplink resource(s), as shown in step 1060. The Node B 1010 receives the uplink transmission in step 1020.

Notably, the UE 1050 and the Node B 1010 both derive a downlink code resource identifier based on the grant message or the used uplink resource(s), as shown in steps 1065 and 1025. The Node B 1010 assigns at least one downlink code sequence used to carry downlink signaling information associated with the derived uplink code resource identifier, and hence associated with the uplink resources used for the uplink transmission. Furthermore, the Node B 1010 then transmits downlink signaling comprising at least one downlink code sequence to the UE 1050 using the downlink resources derived from the granted or used uplink resources, as in step 1030. The UE 1050 then receives the downlink signaling on the derived downlink resource(s), in step 1070, and is able to decode the downlink transmission as it has independently derived the same downlink resource as the Node B 1010 based on the granted or used uplink resource(s).

In the context of the aforementioned description, and in accordance with embodiments of the invention, the term "code sequences" is to be viewed as encompassing time sequences (such as are common in CDMA systems), sinusoidal sequences equivalent to frequency sub-carriers in other cellular communication systems (such as OFDM or FDMA), and generic time/frequency codes in systems employing some degree of a combination of TDMA, FDMA and CDMA. In this manner, the embodiment of the invention can be applied to other cellular communication systems whereby users are allocated resource in the form of time, frequency, or time/frequency codes or sub-carriers of a primary carrier frequency.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The invention can be implemented in any suitable form including hardware, software, firmware, or any combination of these. The invention may optionally be implemented, at least partly, as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and/or functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories as appropriate. Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second", etc., do not preclude a plurality.

What is claimed is:

1. A wireless subscriber communication unit for operation in a cellular communication system having a plurality of shared uplink transmission resources divided into sets of mutually exclusive uplink transmission resources, and a plurality of shared downlink transmission resources divided into sets of mutually exclusive downlink transmission resources, wherein the shared uplink transmission resources are defined in terms of codes and timeslots; the wireless subscriber communication unit comprising:

a transceiver configured to receive scheduling information including an assignment of a scheduled uplink transmission resource from said plurality of shared uplink transmission resources from a network infrastructure apparatus; and a controller configured to derive an uplink resource identifier related to said scheduled uplink transmission resource from said received scheduling information; and wherein:

the transceiver is also configured to transmit an uplink transmission using the scheduled uplink transmission resource, the uplink transmission including the uplink resource identifier;

the controller is:

configured to receive a downlink transmission associated with said uplink transmission on a downlink transmission resource determined from at least one of said received scheduled uplink resource or said uplink resource identifier; and arranged to associate the downlink transmission resource with an acknowledgement signal and with an uplink transmission using the uplink resource identifier, the acknowledgement signal being carried by an Enhanced Uplink Hybrid ARO Indicator Channel (E-HICH) for a set of users, and a downlink code sequence associated with the derived uplink resource identifier being dynamically assigned and re-assigned in a single transmit time interval (TTI), wherein the acknowledgment signal is code-division-multiplexed (CDM).

2. The wireless subscriber communication unit of claim 1, wherein the controller is configured to select data from either a packet data transmission buffer or from a packet re-transmission buffer to be sent by the transceiver using the scheduled uplink transmission resource and including the uplink resource identifier.

3. The wireless subscriber communication unit of claim 2, wherein user data for transmission is fed into the packet data transmission buffer to be sent by the transmit unit using the scheduled uplink transmission resource and including the uplink resource identifier.

4. The wireless subscriber communication unit of claim 2, wherein the controller is able to move data from the packet data transmission buffer into the packet data re-transmission buffer in the event that a negative acknowledgement indication has been received pertaining to the data.

5. The wireless subscriber communication unit of claim 2, wherein the controller prioritizes data from the packet re-transmission buffer ahead of data from the packet data transmission buffer.

6. A method of receiving signaling information in a cellular communication system having a plurality of shared uplink transmission resources divided into sets of mutually exclusive uplink transmission resources, and a plurality of shared downlink transmission resources divided into sets of mutually exclusive downlink transmission resources, wherein the shared uplink transmission resources are defined in terms of codes and timeslots; the method comprising:

receiving scheduling information including an assignment of a scheduled uplink transmission resource from said plurality of shared uplink transmission resources from a network infrastructure apparatus;

deriving an uplink code resource identifier related to said scheduled uplink transmission resource from said received scheduling information;

transmitting an uplink transmission using the scheduled uplink transmission resource, the uplink transmission including the uplink resource identifier; and receiving a downlink transmission associated with said uplink transmission on a downlink transmission resource determined from at least one of said received scheduled uplink resource or said uplink resource identifier, the downlink transmission resource associates an acknowledgment signal with an uplink transmission using the uplink resource identifier, the acknowledgement signal being carried by an Enhanced Uplink Hybrid ARQ Indicator Channel (E-HICH) for a set of users, and a downlink code sequence associated with the derived uplink resource identifier being dynamically assigned and re-assigned in a single transmit time interval (TTI), wherein the acknowledgement signal is code-division-multiplexed (CDM).

7. The method of receiving signaling information in a cellular communication system of claim 6 wherein data for the uplink retransmission is selected from either a packet data transmission buffer or from a packet data re-transmission buffer.

8. The method of receiving signaling information in a cellular communication system of claim 7 wherein user data for transmission is fed into the packet data transmission buffer.

9. The method of receiving signaling information in a cellular communication system of claim 7 wherein data from the packet data transmission buffer is able to be moved to the packet data re-transmission buffer in the event that a negative acknowledgement indication has been received pertaining to the data.

10. The method of receiving signaling information in a cellular communication system of claim 7 wherein data from the packet data re-transmission buffer is given priority over data from the packet transmission buffer.

* * * * *